United States Patent
Oribe et al.

(10) Patent No.: US 11,572,315 B2
(45) Date of Patent: Feb. 7, 2023

(54) THERMAL INSULATION MEMBER

(71) Applicant: NGK INSULATORS, LTD., Nagoya (JP)

(72) Inventors: Akinobu Oribe, Nagoya (JP); Takahiro Tomita, Nagoya (JP); Hiroharu Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 6 days.

(21) Appl. No.: 16/282,703

(22) Filed: Feb. 22, 2019

(65) Prior Publication Data

US 2019/0185379 A1 Jun. 20, 2019

Related U.S. Application Data

(63) Continuation of application No. PCT/JP2017/023608, filed on Jun. 27, 2017.

(30) Foreign Application Priority Data

Aug. 26, 2016 (JP) .............................. JP2016-165764

(51) Int. Cl.
    *B32B 15/00* (2006.01)
    *C04B 35/48* (2006.01)
    (Continued)

(52) U.S. Cl.
    CPC .............. *C04B 35/48* (2013.01); *C04B 38/00* (2013.01); *C04B 38/009* (2013.01);
    (Continued)

(58) Field of Classification Search
    None
    See application file for complete search history.

(56) References Cited

U.S. PATENT DOCUMENTS

| 5,679,452 A | 10/1997 | Minagawa et al. |
| 2007/0110989 A1* | 5/2007 | Shin ............... C04B 38/0087 428/312.2 |

(Continued)

FOREIGN PATENT DOCUMENTS

| CN | 105736904 A | 7/2016 |
| CN | 105753433 A | 7/2016 |

(Continued)

OTHER PUBLICATIONS

Encyclopaedia Britannica, "Four-Stroke Cycle", 2007, Encyclopaedia Britannica, Inc. (Year: 2007).*

(Continued)

*Primary Examiner* — Seth Dumbris
*Assistant Examiner* — Kim S. Horger
(74) *Attorney, Agent, or Firm* — Burr & Brown, PLLC (57) ABSTRACT

A thermal insulation member is directly or indirectly sandwiched between a first object and a second object and thereby suppresses or interrupts heat transfer between the first object and the second object. The thermal insulation member comprises: a first main surface opposed to the first object; and a second main surface positioned on the opposite side from the first main surface and opposed to the second object. The thermal insulation member has a porous structure of ceramic having pores. $ZrO_2$ particles and different type material exist on surfaces of the $ZrO_2$ particles form a skeleton of the porous structure. The different type material includes at least one selected out of $SiO_2$, $TiO_2$, $La_2O_3$, and $Y_2O_3$.

10 Claims, 2 Drawing Sheets

(51) Int. Cl.
  *F16L 59/02* (2006.01)
  *F16L 59/06* (2006.01)
  *C04B 38/00* (2006.01)
  *F01N 3/28* (2006.01)
  *F16L 59/14* (2006.01)

(52) U.S. Cl.
  CPC ............ *F01N 3/2828* (2013.01); *F16L 59/02* (2013.01); *F16L 59/028* (2013.01); *F16L 59/06* (2013.01); *F16L 59/14* (2013.01); *C04B 2235/3244* (2013.01); *C04B 2235/3418* (2013.01); *C04B 2235/5454* (2013.01); *C04B 2235/9607* (2013.01); *F01N 2310/06* (2013.01)

(56) References Cited

U.S. PATENT DOCUMENTS

| | | | |
|---|---|---|---|
| 2007/0163250 A1* | 7/2007 | Sane | F01N 13/148 60/323 |
| 2010/0099547 A1 | 4/2010 | Fukushima et al. | |
| 2010/0126907 A1 | 5/2010 | Chun et al. | |
| 2013/0266801 A1 | 10/2013 | Sakamoto et al. | |
| 2014/0352646 A1* | 12/2014 | Tomita | F28F 13/00 123/193.5 |
| 2016/0185068 A1 | 6/2016 | Shinohara et al. | |
| 2016/0264479 A1 | 9/2016 | Tomita et al. | |
| 2016/0340256 A1* | 11/2016 | Oribe | B23K 26/38 |
| 2016/0368826 A1 | 12/2016 | Calado Da Silva et al. | |

FOREIGN PATENT DOCUMENTS

| | | | | |
|---|---|---|---|---|
| CN | 105814006 A | | 7/2016 | |
| EP | 1 772 441 A1 | | 4/2007 | |
| JP | H09-002881 A1 | | 1/1997 | |
| JP | 2005-288350 A1 | | 10/2005 | |
| JP | 2008-201636 A1 | | 9/2008 | |
| JP | 2012-509827 A1 | | 4/2012 | |
| JP | 2014-172789 A1 | | 9/2014 | |
| WO | 2015/080065 A1 | | 6/2015 | |
| WO | WO-2015119302 A1 * | | 8/2015 | ........ C09D 201/00 |
| WO | 2015/145354 A1 | | 10/2015 | |

OTHER PUBLICATIONS

Extended European Search Report (Application No. 17843195.3) dated Mar. 12, 2020.
Chinese Office Action (Application No. 201780051957.0) dated Mar. 17, 2020 (with English translation).
International Search Report and Written Opinion (Application No. PCT/JP2017/023608) dated Oct. 3, 2017.
International Preliminary Report on Patentability (Application No. PCT/JP2017/023608) dated Mar. 7, 2019 (with English translation).

* cited by examiner

THERMAL INSULATION MEMBER

The present application is a continuation application of International Application No. PCT/JP2017/023608, filed Jun. 27, 2017, which claims priority to Japanese Patent Application No. 2016-165764, filed Aug. 26, 2016. The contents of these applications are incorporated herein by reference in their entirety.

TECHNICAL FIELD

The present invention relates to a thermal insulation member sandwiched between objects.

BACKGROUND ART

A technique for using a porous material as a thermal insulation film has been conventionally proposed. In WO 2015/080065 (Document 1), for example, disclosed is a thermal insulation film in which porous materials are dispersed as a filler in a matrix. The porous material disclosed in Document 1 has a mesh structure. In the mesh structure, $ZrO_2$ particles form a skeleton and different type material exists on surfaces of the $ZrO_2$ particles.

In order to reduce heat transfer, a member for thermal insulation has a soft structure such as a fiber structure, a foam structure, or the like. In such a structure, however, there is a possibility that a thermal insulation member cannot be stably held between objects, depending on the environment. Further, when forces are applied to the objects in a direction in which the objects approach each other, the thermal insulation member is largely deformed and the thermal insulation performance thereof is thereby reduced.

SUMMARY OF INVENTION

The present invention is intended for a thermal insulation member.

The thermal insulation member according to the present invention is directly or indirectly sandwiched between a first object and a second object and thereby suppresses or interrupts heat transfer between the first object and the second object. The thermal insulation member includes a first main surface opposed to the first object and a second main surface positioned on the opposite side from the first main surface and opposed to the second object. The thermal insulation member has a porous structure of ceramic having pores, and $ZrO_2$ particles and different type material existing on surfaces of the $ZrO_2$ particles form a skeleton of the porous structure. The different type material includes at least one selected out of $SiO_2$, $TiO_2$, $La_2O_3$, and $Y_2O_3$.

By the present invention, it is possible to provide a thermal insulation member which is used while being sandwiched between the objects and has high mechanical strength and excellent thermal insulation performance between the objects.

Preferably, in the thermal insulation member, the volume of the different type material relative to the $ZrO_2$ particles is not lower than 0.1 volume percentage and not higher than 30 volume percentage.

Preferably, in the skeleton, the average of minimum widths at connecting parts between $ZrO_2$ particles is not lower than 40% and not higher than 100% of the average particle diameter of the $ZrO_2$ particles.

In a preferable usage example of the thermal insulation member, when the thermal insulation member is sandwiched between the first object and the second object, compressive forces act on the thermal insulation member from the first object and the second object.

The compressive strength of the thermal insulation member is preferably not lower than 10 Mpa and not higher than 1000 MPa. The Young's modulus of the thermal insulation member is preferably not lower than 2 GPa and not higher than 200 GPa. The thermal conductivity of the thermal insulation member is preferably not lower than 0.1 W/mK and not higher than 1.5 W/mK. The heat capacity of the thermal insulation member is preferably not lower than 500 $kJ/m^3K$ and not higher than 2000 $kJ/m^3K$.

These and other objects, features, aspects and advantages of the present invention will become more apparent from the following detailed description of the present invention when taken in conjunction with the accompanying drawings.

DESCRIPTION OF EMBODIMENTS

Figure 1:
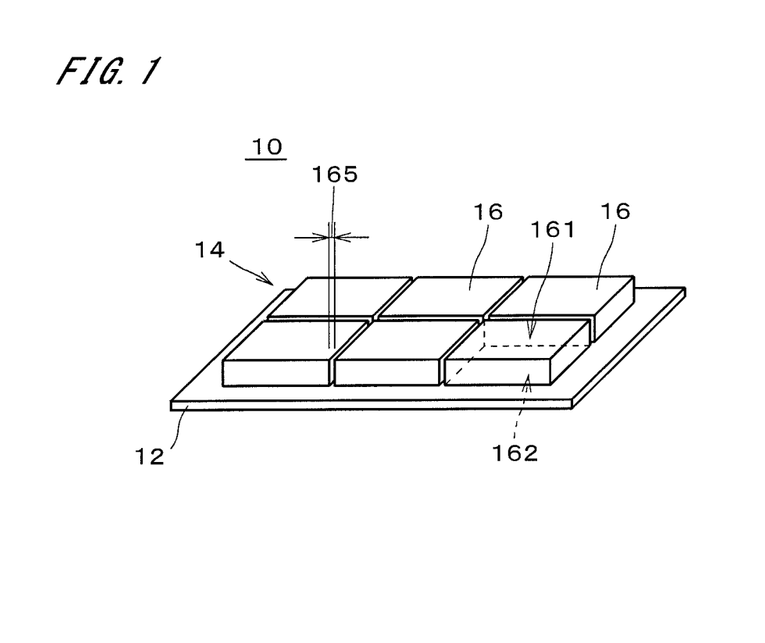
FIG. 1 is a perspective view showing a thermal insulation member aggregate.

FIG. 1 is a perspective view showing a thermal insulation member aggregate 14 in accordance with one preferred embodiment of the present invention. The thermal insulation member aggregate 14 is fixed on a removable sheet 12. Hereinafter, a structure in which the thermal insulation member aggregate 14 is fixed on the sheet 12 will be referred to as an "aggregate sheet 10". The thermal insulation member aggregate 14 is stored, transported, or the like in a state of the aggregate sheet 10, and after or immediately before the thermal insulation member aggregate 14 is arranged at a desired position, the sheet 12 is removed from the thermal insulation member aggregate 14.

The thermal insulation member aggregate 14 is fixed on the sheet 12 by, for example, adhesiveness of the sheet 12. The sheet 12 is, for example, a resin sheet or a resin film having adhesiveness. The adhesiveness (JIS Z0237) of the sheet 12 is preferably 1.0 N/10 mm or higher. The thermal insulation member aggregate 14 can be thereby firmly fixed on the sheet 12. The thermal insulation member aggregate 14 may be temporarily firmly fixed on the sheet 12 with an adhesion interface. The thermal insulation member aggregate 14 may be fixed on the sheet 12 through a pressure sensitive adhesive or the like.

The adhesiveness of the sheet 12 is reduced, for example, by applying heat, water, a solvent, electricity, light (including ultraviolet light), microwaves, an external force or the like to the sheet 12, or by change over time, or the like. It is thereby possible to easily release the fixed state of the thermal insulation member aggregate 14 on the sheet 12 and remove the thermal insulation member aggregate 14 from the sheet 12. The adhesiveness of the sheet 12 at the time when the thermal insulation member aggregate 14 is removed is preferably 0.1 N per 10 mm or lower. It is thereby possible to easily remove the thermal insulation member aggregate 14 from the sheet 12.

The thermal insulation member aggregate 14 includes a plurality of thermal insulation members 16. Each of the thermal insulation members 16 has a plate-like shape. The "plate-like thermal insulation member" includes not only a flat plate-like (flat and not curved) one but also a curved plate-like one and a plate-like one having a non-uniform thickness (minimum length). The number of thermal insulation members 16 included in the thermal insulation member aggregate 14 is not limited to an exemplary number shown in FIG. 1. The entire contour of the thermal insulation member aggregate 14 is also not limited to an example shown in FIG. 1. Though all the thermal insulation members 16 have the same shape in the exemplary case shown in FIG. 1, respective shapes of the plurality of thermal insulation members 16 in a plan view, i.e., planar shapes may be different from one another. By handling a large number of thermal insulation members 16 in the state where the thermal insulation members 16 are fixed on the sheet 12, it is possible to easily arrange the thermal insulation members 16 at desired positions.

In the state shown in FIG. 1, a wide surface 161 on the upper side of each thermal insulation member 16 (a wide surface relatively to a side surface and hereinafter referred to as a "first main surface") is opposed to an object when the thermal insulation member 16 is used, as described later. Another wide surface 162 on the lower side of each thermal insulation member 16 (a wide surface relatively to a side surface and hereinafter referred to as a "second main surface") is opposed to another object when the thermal insulation member 16 is used. In FIG. 1, for only one thermal insulation member 16, rear surfaces are indicated by broken lines. The thermal insulation member 16 is used while being sandwiched between objects and suppresses or interrupts heat transfer between the objects.

Figure 2:
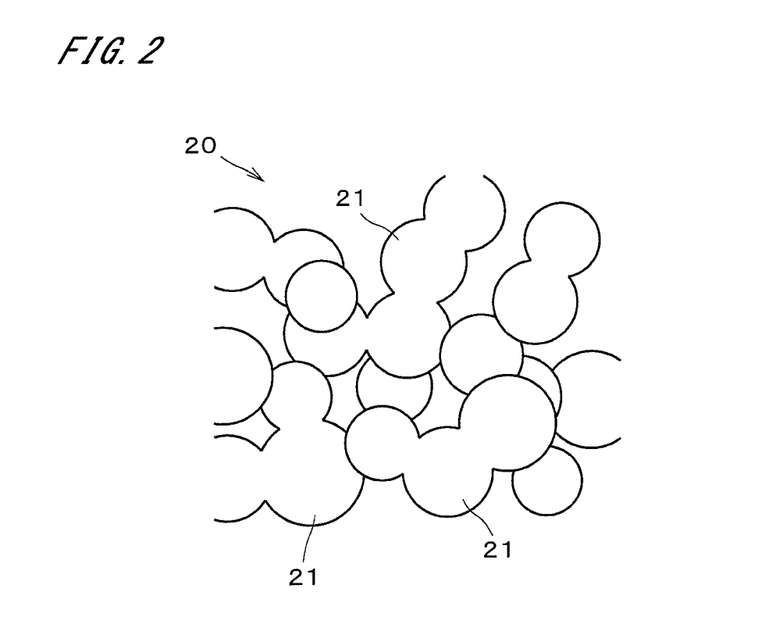
FIG. 2 is a schematic view showing a skeleton having a porous structure.

The thermal insulation member 16 has a porous structure of ceramic having pores. The porous structure has a skeleton having a mesh structure in which fine particles are three-dimensionally connected to one another, and voids other than the skeleton are pores. The fine particles are hereinafter referred to also as "skeleton particles". FIG. 2 is a schematic view showing a skeleton 20 formed of $ZrO_2$ particles 21 which are skeleton particles. The particle diameter of the $ZrO_2$ particle 21 is preferably not smaller than 10 nm and not larger than 5 μm, and further preferably not smaller than 30 nm and not larger than 1 μm. It is thereby possible to suitably inhibit occurrence of lattice vibration (phonon) which is a main cause of thermal conduction and to reduce the thermal conductivity of the thermal insulation member 16. The $ZrO_2$ particle 21 may be a particle formed of one crystal grain (i.e., monocrystalline particle) or may be a particle formed of a multitude of crystal grains (i.e., polycrystalline particle).

Figure 3:
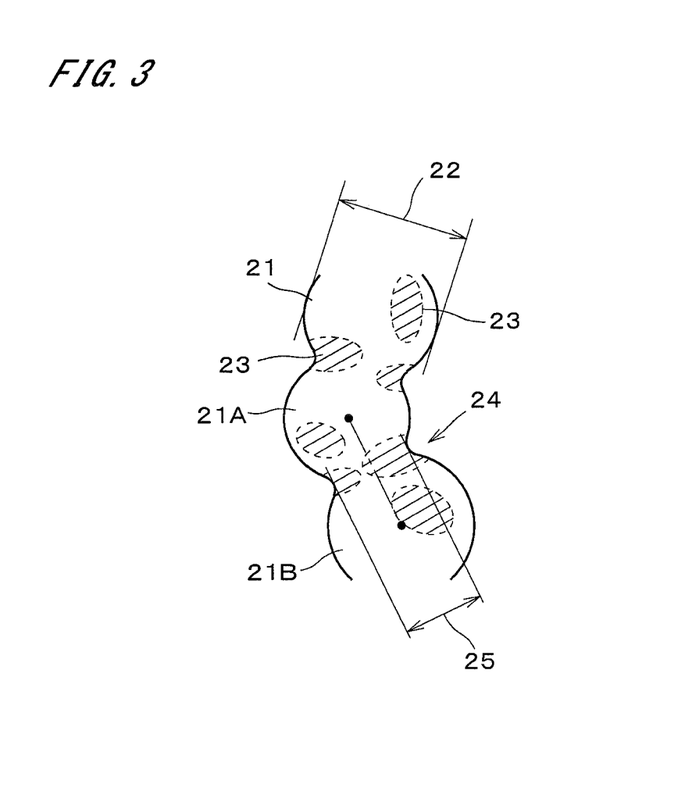
FIG. 3 is a view showing part of the skeleton, which is enlarged.

The particle diameter of the $ZrO_2$ particle 21 is obtained, for example, by measuring the size of one fine particle included in a group of skeleton particles forming the skeleton (for example, the diameter when the fine particle is spherical, or the maximum diameter when not spherical) from an image or the like obtained by observation using an electron microscope. The particle diameter of the $ZrO_2$ particle 21 is acquired, for example, by the following method. As shown in FIG. 3, in an image of a microstructure obtained by observation using a transmission electron microscope (TEM), a $ZrO_2$ particle 21 is specified. An image of the $ZrO_2$ particle 21 is almost a circle, and a maximum distance 22 between a pair of parallel lines sandwiching the particle image is acquired as the maximum diameter.

Assuming that the diameter of the $ZrO_2$ particle is thought as an average particle diameter, the average particle diameter is preferably not smaller than 10 nm and not larger than 1 μm, further preferably not smaller than 10 nm and not larger than 500 nm, and especially preferably not smaller than 10 nm and not larger than 100 nm. For obtaining the average particle diameter of the $ZrO_2$ particles 21, for example, first, the respective maximum diameters of ten or more $ZrO_2$ particles are acquired as the particle diameters from the TEM image by the above-described method. Next, an average value of the acquired maximum diameters is acquired as the average particle diameter of the $ZrO_2$ particles. In the $ZrO_2$ particle, another element (e.g., Mg, Ca, Y, Ce, Yb, Sc, or the like) may be solid-solved, and the $ZrO_2$ particle may be partially stabilized zirconia or fully stabilized zirconia.

The skeleton having the porous structure is formed of the $ZrO_2$ particles and different type material existing on surfaces of the $ZrO_2$ particles. The different type material includes at least one selected out of $SiO_2$, $TiO_2$, $La_2O_3$, and $Y_2O_3$. Preferably, the different type material is at least one selected out of $SiO_2$, $TiO_2$, $La_2O_3$, and $Y_2O_3$. Such a porous structure has excellent thermal insulation performance. In the thermal insulation member 16, when the different type material exists on the surfaces of the $ZrO_2$ particles, since phonon scattering at grain boundaries between the $ZrO_2$ particles and the different type material increases, it is possible to reduce the thermal conductivity. In FIG. 3, areas 23 in which the different type material exist are conceptually indicated by parallel hatch lines.

Further, the concept that "the different type material exists on the surfaces of the $ZrO_2$ particles" includes a state in which the different type material is interposed between the $ZrO_2$ particles. Furthermore, the concept also includes another state in which the $ZrO_2$ particles are connected to one another at small contact points and the different type material exists around the connecting parts, i.e., around neck portions (constricted portions) formed by the connected $ZrO_2$ particles. Moreover, the different type material may exist in a state of being reacted with another material. For example, when the different type material is $SiO_2$, the different type material may exist not only in a form of $SiO_2$ but also as $ZrSiO_4$ formed by reacting with $ZrO_2$, as composite oxide formed by reacting with another different type material, or as an amorphous phase.

It is preferable that the different type material should exist between the $ZrO_2$ particles. Specifically, it is preferable that the different type material should be interposed between the $ZrO_2$ particles (in other words, the different type material should exist at grain boundaries between the $ZrO_2$ particles). When the different type material exists between the $ZrO_2$ particles, since phonon scattering at the grain boundaries between the $ZrO_2$ particles further increases, it is possible to further reduce the thermal conductivity.

It is also preferable that the different type material should be solid-solved in the $ZrO_2$ particles. When the different type material is solid-solved in the $ZrO_2$ particles, it is possible to further reduce the thermal conductivity. The concept that "the different type material is solid-solved in the $ZrO_2$ particles" means a state in which some of elements forming the different type material exist in crystal structures of the $ZrO_2$ particles. For example, the concept means that the Zr site in the crystal structure of the $ZrO_2$ particle is substituted with a metal atom of the different type material. Such a state can be confirmed by performing an elemental analysis using the TEM and a crystal structure analysis using X-ray diffraction.

In the skeleton, the minimum width in connecting parts between the $ZrO_2$ particles, i.e., the average of the widths of the neck portions, is preferably not lower than 40% and not higher than 100% of the average particle diameter of the $ZrO_2$ particles. It is thereby possible to ensure the strength of the thermal insulation member 16. Further, such ensuring of the strength is especially suitable for a case where compressive forces act on the thermal insulation member 16, as described later. The neck portion may be formed of the $ZrO_2$ particles, or may include the different type material.

With reference to FIG. 3, an exemplary case of acquiring the width of the neck portion will be described. First, in the image of the microstructure obtained by observation using the TEM, a $ZrO_2$ particle 21 (represented by reference sign 21A in FIG. 3) and another $ZrO_2$ particle 21 (represented by reference sign 21B) adjacent to this particle are specified. As these particles, selected are ones aligned in a direction almost perpendicular to the line-of-sight direction. Since respective images of the $ZrO_2$ particles 21A and 21B are each almost a circle, a center of each of these particles can be acquired as a center of a circumscribed circle thereof. A pair of parallel lines which are parallel to a straight line connecting the two centers, which are tangent to a neck portion 24 formed by the $ZrO_2$ particles 21A and 21B, are acquired, and a distance 25 between the parallel lines is acquired as the width of the neck portion 24. The same process is performed on ten or more neck portions 24 each formed by adjacent $ZrO_2$ particles 21, and an average value is acquired as the average of the widths of the neck portions 24.

The volume of the different type material relative to the $ZrO_2$ particles is preferably not lower than 0.1 volume percentage and not higher than 30 volume percentage, further preferably not lower than 0.5 volume percentage and not higher than 20 volume percentage, and especially preferably not lower than 1 volume percentage and not higher than 18 volume percentage. By setting the volume within the above-described range, it is possible to give the neck portions appropriate widths while maintaining a skeleton structure and to suppress the thermal conductivity to be low while maintaining the mechanical strength of the thermal insulation member 16.

The $ZrO_2$ particles forming the porous structure and the type of the different type material on the $ZrO_2$ particles can be checked by an elemental analysis using the transmission electron microscope (TEM), a scanning electron microscope (SEM), or a field emission scanning electron microscope (FE-SEM). Further, the volume of different type material relative to the $ZrO_2$ particles can be also obtained by using any one of these microscopes.

When there are two types of different type material, it is preferable that the value of volume ratio should be not smaller than one ninth and not larger than 9. When the above-described value of ratio is out of the above-described range, the effect of adding both the materials is sometimes reduced.

It is preferable that the average particle diameter of the particles of the different type material at a raw material stage should be smaller than the average particle diameter of the $ZrO_2$ particles at a raw material stage. It is thereby possible to make it easy to maintain the properties of $ZrO_2$. In order to get an advantage in terms of manufacturing cost and material properties such as heat resistance, strength, and the like, the average particle diameter of the different type material at the raw material stage is preferably not smaller than 2 nm and not larger than 300 nm, further preferably not smaller than 2 nm and not larger than 100 nm, and especially preferably not smaller than 2 nm and not larger than 50 nm. The "average particle diameter of the different type material" is a value obtained by the same measurement as that of the average particle diameter of the $ZrO_2$ particles described above.

The raw material of the thermal insulation member 16 may contain any particles other than the $ZrO_2$ particles or the different type material. When the raw material contains any other particles, in order to get an advantage in terms of material properties such as heat resistance, strength, and the like, it is preferable that the percentage of the $ZrO_2$ particles and the different type material contained in the raw material should be not lower than 90 volume percentage.

In the porous structure, in order to get an advantage in terms of manufacturing cost and thermal conductivity, the average pore diameter is preferably not smaller than 0.5 nm and not larger than 500 nm, further preferably not smaller than 1 nm and not larger than 300 nm, and especially preferably not smaller than 10 nm and not larger than 100 nm. In the present specification, the "average pore diameter" is a value obtained by measurement using a mercury porosimeter (mercury porosimetry (mercury press-in method)). When the average pore diameter is not larger than 10 nm, the measurement is performed by the gas adsorption method.

The distribution of the pore diameters does not need to be uniform entirely in the thermal insulation member 16, but may be different depending on the position. In other words, the average pore diameter within a certain range may vary at different portions.

In order to get an advantage in terms of thermal conductivity and strength, the porosity of the porous structure is preferably not lower than 20% and not higher than 80%, and further preferably not lower than 20% and not higher than 70%. The porosity of the porous structure is more preferably not lower than 40% and not higher than 70%, and especially preferably not lower than 50% and not higher than 70%. Herein, in the present specification, the "porosity" is a value obtained by measurement using the mercury porosimeter (mercury press-in method). The pores may include closed pores. The shapes of the pores are not particularly limited but may be any one of various shapes.

The thermal conductivity of the thermal insulation member 16 is preferably not higher than 1.5 W/mK, and the lower limit is not restricted but usually not lower than 0.1 W/mK. The thermal conductivity of the thermal insulation member 16 is further preferably not lower than 0.1 W/mK and not higher than 1 W/mK. It is thereby possible to achieve an excellent thermal insulation effect. The "thermal conductivity" is a value obtained by the following calculation. First, the density of the thermal insulation member is measured by the mercury porosimeter. Next, the specific heat of the thermal insulation member is measured by using a differential scanning calorimeter (DSC). Subsequently, the thermal diffusivity of the thermal insulation member is measured by a light-irradiation AC method. After that, from the equation of (thermal diffusivity)×(specific heat)×density= (thermal conductivity), the thermal conductivity of the thermal insulation member is calculated.

The heat capacity of the thermal insulation member 16 is preferably not lower than 500 $kJ/m^3K$ and not higher than 2000 $kJ/m^3K$, and further preferably not lower than 500 $kJ/m^3K$ and not higher than 1500 $kJ/m^3K$.

The aspect ratio of each thermal insulation member 16 is preferably not less than 3, further preferably not less than 5, and more preferably not less than 7. The aspect ratio of the thermal insulation member 16 is a ratio of the maximum length of one main surface to the thickness thereof. The one main surface is the widest plane among a plurality of planes forming the surface of the thermal insulation member 16.

The maximum length of the main surface is the longest distance among distances each between a pair of parallel straight lines sandwiching an outer periphery of the main surface. The thickness of the thermal insulation member 16 is preferably not smaller than 0.1 mm, and the upper limit is not restricted but is, for example, not larger than 10 mm. The thickness of the thermal insulation member 16 is further preferably not smaller than 0.5 mm and not larger than 5 mm.

The shape of the thermal insulation member 16 in a plan view is rectangle, the length of one side is not shorter than 0.1 mm, and the upper limit is not restricted but is, for example, not longer than 10 mm. The length of one side is further preferably not shorter than 0.5 mm and not longer than 5 mm. The thermal insulation member 16 usually has a plate-like shape or a tile-like shape but may be a large block-like shape. By using the thermal insulation member 16 having a tile-like shape, it is possible to arrange a plurality of thermal insulation members 16 on a curved surface.

Next, as an exemplary method of manufacturing the thermal insulation member aggregate 14, a method using tape casting will be described. First, by adding and mixing a pore-forming material, a binder, a plasticizer, a solvent, and the like to powder of the constituent material of the thermal insulation member 16, a casting slurry is prepared.

The pore-forming material is not particularly limited only if the material will be extinguished to form a plurality of pores in the later sintering process. As the pore-forming material, for example, carbon black, latex particles, melamine resin particles, polymethyl methacrylate (PMMA) particles, polyethylene particles, polystyrene particles, a foaming resin, a water-absorbing resin, or the like can be used. Among these materials, preferable is carbon black which has a small particle size and easily forms small pores in a porous material.

As the binder, a polyvinyl butyral resin (PVB), a polyvinyl alcohol resin, a polyvinyl acetate resin, a poly acrylic resin, or the like can be used. As the plasticizer, dibutyl phthalate (DBP), dioctyl phthalate (DOP), or the like can be used. As the solvent, xylene, 1-butanol, or the like can be used.

The percentage of the $ZrO_2$ particles contained in the slurry is preferably not lower than 5 volume percentage and not higher than 20 volume percentage. The percentage of the different type material contained in the slurry is preferably not lower than 0.1 volume percentage and not higher than 5 volume percentage. The percentage of the pore-forming material contained in the slurry is preferably not lower than 0 volume percentage and not higher than 20 volume percentage. The percentage of the other components contained in the slurry is preferably not lower than 70 volume percentage and not higher than 90 volume percentage.

Subsequently, by performing a vacuum degassing process on the casting slurry, viscosity adjustment is performed. It is preferable that the viscosity of the slurry should be not lower than 0.1 Pa·s and not higher than 10 Pa·s.

In the tape casting, for example, the casting slurry is placed on a polyester film, and a green body is prepared by using a doctor blade and the like so that the thickness after sintering may become desired one. The green body is removed from the polyester film and collected.

By sintering the collected green body, a plate-like sintered body is formed. The sintering is preferably performed at not lower than 800° C. and not higher than 2000° C. for not shorter than 0.5 hours and not longer than 20 hours, further preferably performed at not lower than 800° C. and not higher than 1800° C. for not shorter than 0.5 hours and not longer than 15 hours, and especially preferably performed at not lower than 800° C. and not higher than 1300° C. for not shorter than 0.5 hours and not longer than 10 hours.

Next, one main surface of the plate-like sintered body is mirror-finished to have roughness Ra of 1 μm, and the sintered body is adhered on the sheet 12 with the mirror-finished surface being opposed to a surface of the sheet 12. In the case where the pressure sensitive adhesive is applied onto the sheet 12, a surface on the opposite side from the mirror-finished surface may be adhered on the sheet 12. The mirror finishing does not have to be performed. After that, by dividing the sintered body on the sheet 12, a state in which a plurality of thermal insulation members 16 (i.e., the thermal insulation member aggregate 14) are adhered on the sheet 12 can be obtained. Since the sintered body is firmly adhered on the sheet 12, it is possible to prevent the thermal insulation members 16 from being removed from the sheet 12 during division of the sintered body.

Division, i.e., cracking of the sintered body may be performed by any one of various methods. By cutting (or cracking) the sintered body with an edge tool being pressed thereagainst, for example, the plurality of thermal insulation members 16 are formed. Alternatively, there may be a method in which grooves are formed by repeatedly pressing an edge tool against the sintered body with hands, by pressing a lattice-shaped cutting edge against the sintered body with a press or a rolling machine, or by using a laser beam machine, and the sintered body is cracked along the grooves. The cracking of the sintered body may be performed using hands or a machine. The grooves may be formed by the same method as described above at any stage before the sintering. The sintered body may be cracked without providing any groove.

As another preferable exemplary method of manufacturing the thermal insulation member aggregate 14, a method using extrusion molding may be used. When the thickness of the green body is large, the extrusion molding is especially preferable. First, by adding and mixing a pore-forming material, a binder, a plasticizer, a solvent, and the like to powder of the constituent material of the thermal insulation member 16, a molding paste (body paste) is prepared. As the pore-forming material, the binder, the plasticizer, the solvent, and the like, appropriate ones for the extrusion molding are adopted.

Next, by extruding a paste from a mouthpiece provided with an elongated opening and relatively moving the mouthpiece along a support plate, the green body is formed continuously on the support plate. After drying, the green body is removed from the support plate and collected. By sintering the green body, the plate-like sintered body is formed. In principle, the sintering condition is the same as that in the tape casting but adjusted as appropriate as the need arises. After that, the sintered body is adhered on the sheet 12 and the division of the sintered body is performed by the above-described method. Further, for forming the green body, other various methods for manufacture of ceramic may be also used. For example, press molding, injection molding, casting, or the like may be used.

Figure 4:
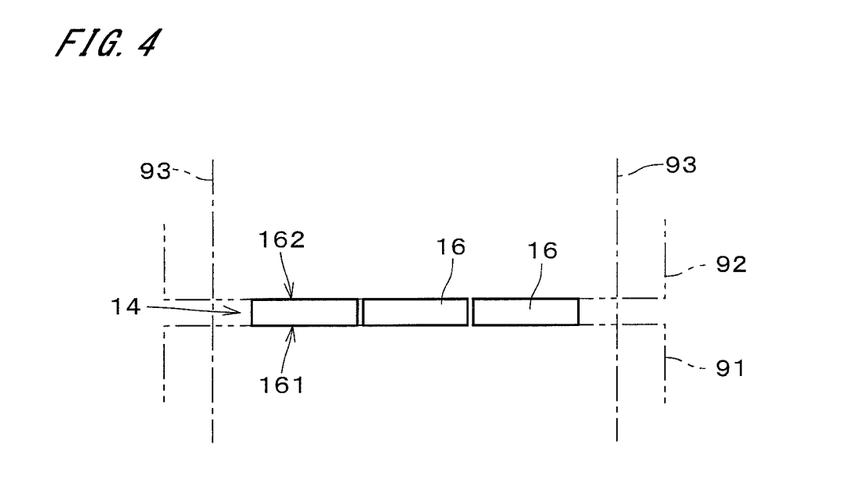
FIG. 4 is a view showing a state in which the thermal insulation member aggregate is arranged between a first object and a second object.

FIG. 4 is a view showing a state in which the thermal insulation member aggregate 14 is arranged between a first object 91 and a second object 92. One of the first object 91 and the second object 92 is a high-temperature portion and the other is a relatively low-temperature portion. The thermal insulation member aggregate 14, i.e., the plurality of thermal insulation members 16 are directly sandwiched between the first object 91 and the second object 92. The thermal insulation member 16 thereby suppresses or interrupts heat transfer occurring between the first object 91 and the second object 92. The thermal insulation members 16 may be indirectly sandwiched between the first object 91 and the second object 92. For example, between the thermal insulation members 16 and the first object 91 or the second object 92, any other member such as a sheet or the like may be interposed.

In the state shown in FIG. 4, it is assumed that a lower main surface of each thermal insulation member 16 is the first main surface 161 in FIG. 1 and an upper main surface thereof is the second main surface 162 in FIG. 1. The first main surface 161 is opposed to the first object 91. The second main surface 162 is opposed to the second object 92. Only if the first main surface 161 and the second main surface 162 are positioned on the opposite sides of the thermal insulation member 16, these main surfaces do not need to be positioned vertically on the upper and lower sides.

The first object 91 and the second object 92 are each a substance having rigidity enough to support the thermal insulation members 16 while sandwiching the thermal insulation members 16. The first object 91 and the second object 92 are each, for example, a metal, a resin, plastic, wood, ceramic, cement, concrete, pottery or porcelain material, glass, or the like. The first object 91 and the second object 92 may be the same material or may be different materials.

In the exemplary case shown in FIG. 4, the first object 91 and the second object 92 are given forces by bolts 93 which are fastening members in a direction in which these objects approach each other. In FIG. 4, for the bolts 93, only their centerlines are shown. There may be another structure, for example, where the first object 91 and the thermal insulation members 16 are fixed to each other with an adhesive agent and the second object 92 and the thermal insulation members 16 are fixed to each other with the adhesive agent. The thermal insulation members 16 may be simply held with being sandwiched between the first object 91 and the second object 92 without using the adhesive agent or the like. The surface of the first object 91 which is opposed to the thermal insulation member aggregate 14 is not limited to a plane but may be a curved surface. The surface of the second object 92 which is opposed to the thermal insulation member aggregate 14 is not also limited to a plane but may be a curved surface.

Since the compressive strength of the thermal insulation member 16 is high, it is preferable that the thermal insulation member 16 should be used in a case where the thermal insulation member 16 is sandwiched between the first object 91 and the second object 92 and compressive forces act on the thermal insulation member 16 from the first object 91 and the second object 92. The compressive strength of the thermal insulation member 16 is preferably not lower than 10 MPa, and further preferably not lower than 50 MPa. Further, the compressive strength of the thermal insulation member 16 has no upper limit but is usually not higher than 1000 MPa.

Furthermore, in the case where the compressive forces act on the thermal insulation member 16 from the first object 91 and the second object 92, it is desirable that the change in position of the thermal insulation member 16 relative to the first object 91 and the second object 92 should be small. For this reason, the Young's modulus of the thermal insulation member 16 is preferably not lower than 2 GPa, and further preferably not lower than 5 GPa. The Young's modulus of the thermal insulation member 16 has no upper limit but is usually not higher than 300 GPa.

When the thermal insulation member aggregate 14 is disposed, for example, the aggregate sheet 10 is arranged on the first object 91 with the sheet 12 positioned upper. The sheet 12 is removed from the thermal insulation member aggregate 14 and the second object 92 is further disposed on the thermal insulation member aggregate 14. Between the thermal insulation member aggregate 14 and the first object 91, the pressure sensitive adhesive or the adhesive agent may be interposed, and also between the thermal insulation member aggregate 14 and the second object 92, the pressure sensitive adhesive or the adhesive agent may be interposed. The thermal insulation member aggregate 14 and the sheet 12 may be sandwiched between the first object 91 and the second object 92 without removing the sheet 12 from the thermal insulation member aggregate 14.

Further, the compressive forces do not always need to act on the thermal insulation member 16, and the thermal insulation member 16 may be sandwiched between the first object 91 and the second object 92 without any compressive force acting on the thermal insulation member 16. At that time, the thermal insulation member 16 may have not only a thermal insulation function but also a function as a structural member for supporting the second object 92 relative to the first object 91. Hereinafter, the first object 91 and the second object 92 between which the thermal insulation member 16 is disposed will be each referred to simply as an "object".

Since a large number of different type materials are present on the surfaces of the $ZrO_2$ particles, especially in the connecting parts between the particles in the thermal insulation member 16, the thermal insulation member 16 has mechanical strength high enough to be used while being sandwiched between the objects, and can exhibit excellent thermal insulation performance between the objects.

Table 1 indicates Examples of the thermal insulation member. In the column for evaluation of thermal insulation property in Table 1, "A" indicates "Best", "B" indicates "Very Good", "C" indicates "Good", "D" indicates "Rather Bad", and "E" indicates "Bad".

TABLE 1

| | | Type of Different Type Material | Volume of Different Type Material (volume %) | Width of Neck Portion Relative to Particle Diameter (%) | State When Sandwiched Between Objects | Evaluation of Thermal Insulation Property |
|---|---|---|---|---|---|---|
| Example | 1 | $TiO_2$, $SiO_2$ | 10 | 80 | Not Changed | A |
| | 2 | $TiO_2$, $SiO_2$ | 20 | 90 | Not Changed | B |
| | 3 | $TiO_2$, $SiO_2$ | 5 | 70 | Not Changed | B |

TABLE 1-continued

|  |  | Type of Different Type Material | Volume of Different Type Material (volume %) | Width of Neck Portion Relative to Particle Diameter (%) | State When Sandwiched Between Objects | Evaluation of Thermal Insulation Property |
|---|---|---|---|---|---|---|
|  | 4 | $SiO_2$ | 10 | 70 | Not Changed | B |
|  | 5 | $TiO_2$ | 10 | 70 | Not Changed | B |
|  | 6 | $La_2O_3$ | 5 | 50 | Not Changed | B |
|  | 7 | $TiO_2$ | 0.1 | 40 | Slightly Deformed, Partially Broken | C |
| Comparative Example | 1 | — | — | — | Deformed (Crushed) | E |
|  | 2 | None | 0 | 20 | Broken | D |

In Example 1, as the different type material, $TiO_2$ and $SiO_2$ are used. Respective ratios of these materials are the same, and specifically, the ratio of $TiO_2$ is 50% and that of $SiO_2$ is 50% of the whole different type material. The volume of different type material relative to the $ZrO_2$ particles is 10 volume percentage. The width of the neck portion relative to the average particle diameter of $ZrO_2$ is 80%. When the thermal insulation member is sandwiched between the objects and predetermined compressive forces are applied thereto, no change occurs. The evaluation rating of thermal insulation property indicates "Best".

In Example 2, as the different type material, $TiO_2$ and $SiO_2$ are used. Respective ratios of these materials are the same. The volume of the different type material relative to the $ZrO_2$ particles is 20 volume percentage. The width of the neck portion relative to the average particle diameter of $ZrO_2$ is 90%. When the thermal insulation member is sandwiched between the objects and predetermined compressive forces are applied thereto, no change occurs. The evaluation rating of thermal insulation property indicates "Very Good".

In Example 3, as the different type material, $TiO_2$ and $SiO_2$ are used. Respective ratios of these materials are the same. The volume of the different type material relative to the $ZrO_2$ particles is 5 volume percentage. The width of the neck portion relative to the average particle diameter of $ZrO_2$ is 70%. When the thermal insulation member is sandwiched between the objects and predetermined compressive forces are applied thereto, no change occurs. The evaluation rating of thermal insulation property indicates "Very Good".

In Example 4, as the different type material, $SiO_2$ is used. The volume of the different type material relative to the $ZrO_2$ particles is 10 volume percentage. The width of the neck portion relative to the average particle diameter of $ZrO_2$ is 70%. When the thermal insulation member is sandwiched between the objects and predetermined compressive forces are applied thereto, no change occurs. The evaluation rating of thermal insulation property indicates "Very Good".

In Example 5, as the different type material, $TiO_2$ is used. The volume of the different type material relative to the $ZrO_2$ particles is 10 volume percentage. The width of the neck portion relative to the average particle diameter of $ZrO_2$ is 70%. When the thermal insulation member is sandwiched between the objects and predetermined compressive forces are applied thereto, no change occurs. The evaluation rating of thermal insulation property indicates "Very Good".

In Example 6, as the different type material, $La_2O_3$ is used. The volume of the different type material relative to the $ZrO_2$ particles is 5 volume percentage. The width of the neck portion relative to the average particle diameter of $ZrO_2$ is 50%. When the thermal insulation member is sandwiched between the objects and predetermined compressive forces are applied thereto, no change occurs. The evaluation rating of thermal insulation property indicates "Very Good".

In Example 7, as the different type material, $TiO_2$ is used. The volume of the different type material relative to the $ZrO_2$ particles is 0.1 volume percentage. The width of the neck portion relative to the particle diameter of the $ZrO_2$ particle is 40%. When the thermal insulation member is sandwiched between the objects and predetermined compressive forces are applied thereto, the thermal insulation member is slightly deformed and partially broken. The evaluation rating of thermal insulation property indicates "Good".

In Comparative Example 1, a rock wool-based thermal insulation material is used. Since the rock wool-based thermal insulation material has poor rigidity, when predetermined compressive forces are applied thereto, the thermal insulation material is largely deformed. With this deformation, the evaluation rating of thermal insulation property indicates "Bad".

In Comparative Example 2, the same $ZrO_2$ particles as used in Examples 1 to 7 are used, and without adding any different type material, sintering is performed at relatively low temperature. The width of the neck portion relative to the average particle diameter of $ZrO_2$ is 20%. When the thermal insulation member is sandwiched between the objects and predetermined compressive forces are applied thereto, the thermal insulation member is broken. The evaluation rating of thermal insulation property indicates "Rather Bad".

From the above Examples, it is found preferable that the average width of the neck portions should be not lower than 40% of the average particle diameter of the $ZrO_2$ particles. More preferably, the average width of the neck portions should be not lower than 50% of the average particle diameter of the $ZrO_2$ particles. The average width of the neck portions is usually not higher than 100% of the average particle diameter of the $ZrO_2$ particles. In the above Examples, though the volume of the different type material relative to the $ZrO_2$ particles varies from 0.1 volume percentage to 20 volume percentage, as a result of seeing the other experimental results, as described earlier, it is found preferable that the volume of the different type material relative to the $ZrO_2$ particles should be not lower than 0.1 volume percentage and not higher than 30 volume percentage.

As a result of repeating this experiment, the following tendency is found.

As the raw material particle diameter of the different type material becomes smaller, the different type material is dispersed uniformly and it becomes easier to form a large number of neck portions each having a large width.

As the volume of the different type material increases, the width of the neck portion easily becomes larger.

When a plurality of types of different type material are added, the width of the neck portion easily becomes larger.

Depending on the type of the different type material, there is a difference in the width of the neck portion. Among $SiO_2$, $TiO_2$, $La_2O_3$, and $Y_2O_3$, when $SiO_2$ is added, the width of the neck portion becomes largest, and the width of the neck portion becomes smaller in the order of $TiO_2$ and $La_2O_3$. The width of the neck portion in the case of adding $La_2O_3$ and that in the case of adding $Y_2O_3$ are almost the same.

As the sintering temperature becomes higher, the average particle diameter of $ZrO_2$ becomes larger and the width of the neck portion becomes larger.

As the sintering time becomes longer, the average particle diameter of $ZrO_2$ becomes larger and the width of the neck portion becomes larger.

As the width of the neck portion becomes larger, the thermal insulation member becomes harder to deform when sandwiched between the objects but the thermal insulation property becomes worse. In other words, heat becomes easier to transfer through the neck portion.

As the average particle diameter of the raw material particles of $ZrO_2$ becomes smaller, the average particle diameter of the $ZrO_2$ particles after sintering becomes smaller.

In the exemplary case shown in FIG. 1, a planar shape of each thermal insulation member 16 viewed from an upper surface is square. As described earlier, the planar shape of the thermal insulation member 16 is not limited to square but is preferably a polygonal shape. The shape of each thermal insulation member 16 may be different from that of the other thermal insulation members 16. The thermal insulation member aggregate 14 may have, for example, a portion in which five or more thermal insulation members 16 are each arranged with one vertex opposed to one another. Further, the outer periphery of the planar shape of any one thermal insulation member 16 may include a curved line. When the planar shape of the thermal insulation member 16 includes a curved line or a polygonal line which is engaged with the line of the adjacent thermal insulation member 16, it is possible to suppress positional difference between these thermal insulation members 16. It is thereby possible to easily arrange the thermal insulation members 16 on the first object 91 or the second object 92.

As shown in FIG. 1, in the thermal insulation member aggregate 14, a clearance 165 between adjacent thermal insulation members 16 is preferably not smaller than 0.1 μm and not larger than 10 μm. It is thereby possible to easily arrange the plurality of thermal insulation members 16 on the object. The above-described clearance 165 is a distance of the smallest portion among the clearances between adjacent thermal insulation members 16. The clearance 165 is obtained, for example, by measuring the distance between adjacent thermal insulation members 16, with an optical microscope or the like, in the thermal insulation member aggregate 14 adhered on the sheet 12.

In the thermal insulation member aggregate 14, when respective side surfaces of adjacent thermal insulation members 16 are opposed to each other in parallel, it is preferable that the angle formed by the side surface and the normal of the sheet 12 should be not smaller than 0 degrees and not larger than 45 degrees. When the thermal insulation member aggregate 14 is arranged on the object, it is thereby possible to prevent or suppress chipping of the thermal insulation member 16. The side surface is not limited to a plane and the angle formed by the side surface and the normal of the sheet 12 does not need to be constant.

When the shapes of the thermal insulation members 16 are not uniform in the thermal insulation member aggregate 14, usually the number densities of the thermal insulation members 16 in the thermal insulation member aggregate 14 are also not uniform. The ratio of a maximum value of the number density to a minimum value thereof (i.e., maximum number density/minimum number density) is preferably not smaller than 1 and not larger than 1.5. By suppressing variation in the number density, it is possible to easily arrange the thermal insulation member aggregate 14 on the object.

Further, when the shapes of the thermal insulation members 16 are not uniform in the thermal insulation member aggregate 14, the sizes of the planar shapes of the thermal insulation members 16 in the thermal insulation member aggregate 14 are also not uniform. The ratio of a maximum value of the size of the planar shape to a minimum value thereof (i.e., (maximum area)/(minimum area)) is preferably not smaller than 1 and not larger than 1.5. By suppressing variation in the area of the thermal insulation member 16, it is possible to easily arrange the thermal insulation member aggregate 14 on the object.

Furthermore, when the surface of the object includes a portion which is not flat, by reducing the number density of the thermal insulation members 16 and increasing the size of the planar shape of each thermal insulation member 16 in a flat area and increasing the number density of the thermal insulation members 16 and reducing the size of the planar shape of each thermal insulation member 16 in an unflat area, it is possible to cause the plurality of thermal insulation members 16 to be arranged while following the surface of the object.

The above-described number density can be obtained, for example, by observing any fields of view of a plurality of portions in the thermal insulation member aggregate 14 adhered on the sheet 12 with the optical microscope or the like and dividing the number of thermal insulation members 16 included in each field of view by the area of field of view.

The tensile elongation (JIS K7127) of the sheet 12 on which the thermal insulation member aggregate 14 is fixed is preferably not lower than 0.5%. Even when the surface of the object is curved, it is thereby possible to cause the plurality of thermal insulation members 16 on the sheet 12 to be easily arranged while following the surface of the object with high accuracy. Further, the thickness of the sheet 12 is preferably larger than 0 mm and not larger than 5 mm. Even when the surface of the object is curved, it is thereby possible to cause the plurality of thermal insulation members 16 on the sheet 12 to be easily arranged while following the surface of the object with high accuracy.

In the state of FIG. 4, a matrix may be present between or around the thermal insulation members 16 for the purpose of joining the thermal insulation members 16 to one another and protecting the thermal insulation members 16. It is preferable that the matrix should include at least one type of ceramic, glass and a resin. In terms of excellent heat resistance, it is more preferable that the matrix should be ceramic or glass. More specifically, as a material for the matrix, for example, silica, alumina, mullite, zirconia, titania, silicon nitride, silicon oxynitride, silicon carbide, silicon oxycarbide, calcium silicate, calcium aluminate, calcium aluminosilicate, aluminum phosphate, potassium aluminosilicate, glass, or the like may be used. In terms of lower thermal conductivity, it is preferable that these should be amorphous.

When the material of the matrix is ceramic, it is desirable that the matrix should be an aggregate of fine particles each having a particle diameter of 500 nm or smaller. By using the aggregate of fine particles each having a particle diameter of 500 nm or smaller as the matrix, it is possible to suppress the thermal conductivity to be low. Further, when the material of the matrix is a resin, as the matrix, a silicone resin, a polyimide resin, a polyamide resin, an acrylic resin, an epoxy resin, or the like may be used. It is preferable that the porosity of the matrix should be not lower than 0% and not higher than 70%.

A suitable usage example of the thermal insulation member aggregate 14 is a structure for fixing an exhaust gas purification catalyst carrier to an exhaust pipe in a vehicle. Conventionally, a honeycomb-shaped ceramic which is the purification catalyst carrier is wrapped with a mat formed of fibrous ceramic and pushed into a metal pipe on the exhaust pipe, to be fixed. On the other hand, in recent years, the request has increased that the catalyst supported by the honeycomb-shaped ceramic should be warmed at an early stage and the exhaust gas should be purified with high efficiency from immediately after the start-up of an engine. Then, by sandwiching the thermal insulation member aggregate 14 between an outer periphery of the honeycomb-shaped ceramic and the metal pipe, it is possible to suppress heat emission from the honeycomb-shaped ceramic through the metal pipe. As a result, warming of the catalyst can be realized at an early stage from immediately after the start-up of the engine.

In order to prevent breakage of the honeycomb-shaped ceramic due to oscillation of a vehicle, it is required that the honeycomb-shaped ceramic should be fixed inside the metal pipe so as not to move. For this reason, in order to dispose a soft thermal insulation member between the honeycomb-shaped ceramic and the metal pipe, the thermal insulation member needs to be disposed in a state of being crushed. In this case, the thermal insulation performance is disadvantageously reduced. In contrast to this, since the thermal insulation members 16 of the thermal insulation member aggregate 14 are formed of ceramic having a porous structure with high mechanical strength, the thermal insulation performance is not reduced even when the thermal insulation member aggregate 14 is held between the honeycomb-shaped ceramic and the metal pipe.

The above-described thermal insulation member aggregate 14 and thermal insulation member 16 allow various variations.

The sheet 12 on which the thermal insulation member aggregate 14 is fixed is not limited to the resin sheet or the resin film having adhesiveness, but may have any one of various structures. For example, the sheet 12 may be formed by applying the adhesive agent or the like onto a base material (i.e., a supporting member). When the surface of the object is curved, the base material of the sheet 12 is preferably cloth, a rubber sheet, foam, or the like. Thus, by using the base material which is relatively soft and has elasticity, it is possible to cause the plurality of thermal insulation members 16 on the sheet 12 to be easily arranged while following the surface of the object with high accuracy. Further, when the surface of the object is flat, the base material of the sheet 12 is preferably a film, a metal foil, paper, or the like. Thus, by using a relatively hard base material, it is possible to prevent or suppress positional difference of the thermal insulation members 16 due to occurrence of wrinkle in the sheet 12 when the plurality of thermal insulation members 16 are transferred onto the surface of the object.

Instead of the thermal insulation member aggregate 14, one thermal insulation member 16 may be sandwiched between the first object 91 and the second object 92. In other words, the thermal insulation member aggregate 14 is formed of at least one thermal insulation member 16.

As described earlier, the distribution of the pores in the thermal insulation member 16 does not have to be uniform. For example, in respective areas in the vicinity of the surfaces opposed to the first object 91 and the second object 92, the porosity may be lower than that inside the thermal insulation member 16, and further, there may be a case where only closed pores are present in these areas. Modification treatment may be performed on the respective surfaces opposed to the first object 91 and the second object 92.

The thermal insulation member aggregate 14 having two or more layers may be sandwiched between the first object 91 and the second object 92. For example, a thermal insulation member aggregate 14 is fixed on the first object 91 and another thermal insulation member aggregate 14 is also fixed on the second object 92, and the first object 91 and the second object 92 are joined to each other, to thereby arrange a thermal insulation member aggregate 14 having two layers between the first object 91 and the second object 92.

The method of manufacturing the thermal insulation member aggregate 14 and the method of manufacturing the thermal insulation member 16 are not limited to the above-described methods but may be changed in various manners.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

16 Thermal insulation member
20 Skeleton
21 $ZrO_2$ particle
24 Neck portion (connecting part between particles)
91 First object
92 Second object
161 First main surface
162 Second main surface

The invention claimed is:

1. A thermal insulation member aggregate comprising:
a plurality of thermal insulation members having a plate shape, a tile shape, or a block shape,
which are directly sandwiched between a first object and a second object and thereby suppresses or interrupts heat transfer between said first object and said second object;
a first main surface opposed to said first object; and
a second main surface positioned on the opposite side from said first main surface and opposed to said second object, each of said plurality of thermal insulation members having a porous structure of ceramic having pores, wherein $ZrO_2$ particles and different type material existing on surfaces of said $ZrO_2$ particles form a skeleton of said porous structure, said different type material includes at least one selected out of $SiO_2$, $TiO_2$, $La_2O_3$, and $Y_2O_3$, and wherein in said skeleton, an average of minimum widths at connecting parts between $ZrO_2$ particles is not lower than 50% and not higher than 90% of an average particle diameter of said $ZrO_2$ particles.

2. The thermal insulation member aggregate according to claim 1, wherein the volume of said different type material relative to said $ZrO_2$ particles is not lower than 0.1 volume percentage and not higher than 30 volume percentage.

3. The thermal insulation member aggregate according to claim 1, wherein when each of said plurality of thermal insulation members is sandwiched between said first object and said second object, compressive forces act on each of said plurality of thermal insulation members from said first object and said second object.

4. The thermal insulation member aggregate according to claim 1, wherein a compressive strength is not lower than 10 Mpa and not higher than 1000 MPa.

5. The thermal insulation member aggregate according to claim 1, wherein a Young's modulus is not lower than 2 GPa and not higher than 200 GPa.

6. The thermal insulation member aggregate according to claim 1, wherein a thermal conductivity is not lower than 0.1 W/mK and not higher than 1.5 W/mK.

7. The thermal insulation member aggregate according to claim 1, wherein a heat capacity is not lower than 500 $kJ/m^3K$ and not higher than 2000 $kJ/m^3K$.

8. The thermal insulation member aggregate according to claim 1, wherein an average particle diameter of said $ZrO_2$ particle is not smaller than 10 nm and not larger than 1 μm, and an average pore diameter in said porous structure is not smaller than 0.5 nm and not larger than 500 nm.

9. The thermal insulation member aggregate according to claim 1, wherein the first object and the second object are formed of at least one material selected from the group consisting of metal, resin, plastic, wood, ceramic, cement, concrete, pottery or porcelain material, and glass.

10. The thermal insulation member aggregate according to claim 1, wherein the plurality of thermal insulation members is formed as a single layer, such that said first object directly abuts only said first main surface and said second object directly abuts only said second main surface.

* * * * *